United States Patent [19]

McSherry et al.

[11] Patent Number: 4,993,901
[45] Date of Patent: Feb. 19, 1991

[54] OVER-CENTER HOLLOW WALL ANCHOR WITH ENHANCED HOLDING STRENGTH

[75] Inventors: Thomas W. McSherry, Stamford, Conn.; Nathaniel H. Garfield, Harrison, N.Y.

[73] Assignee: Mechanical Plastics Corp., Pleasantville, N.Y.

[21] Appl. No.: 484,725

[22] Filed: Feb. 26, 1990

[51] Int. Cl.⁵ .................... F16B 13/04; F16B 21/00
[52] U.S. Cl. ................................. 411/340; 411/55; 411/38
[58] Field of Search .................... 411/34–38, 411/55, 60, 908, 340, 341, 344

[56] References Cited

U.S. PATENT DOCUMENTS

| | | | |
|---|---|---|---|
| 4,704,057 | 11/1987 | McSherry | 411/55 |
| 4,712,956 | 12/1987 | Bond et al. | 411/55 |
| 4,828,439 | 5/1989 | Giannuzzi | 411/38 |
| 4,878,790 | 11/1989 | McSherry et al. | 411/340 |

*Primary Examiner*—Neill R. Wilson
*Attorney, Agent, or Firm*—Israel Nissenbaum

[57] ABSTRACT

A plastic over-center hollow wall anchor having increased strength without increase in thickness of load bearing members and necessitation of a larger insertion aperture. The bending motion stress on the load bearing arms, which causes the weakening or failure mode of the anchor, is substantially retarded by the inclusion of a small reinforcing boss across the bending area.

7 Claims, 3 Drawing Sheets

OVER-CENTER HOLLOW WALL ANCHOR WITH ENHANCED HOLDING STRENGTH

This invention relates to improvements in plastic over-center hollow wall anchors and particularly to improvements in holding strength for over-center hollow wall anchors such as described in U.S. Pat. No. 3,651,734 and sold throughout the world under the trademark TOGGLER.

Hollow wall over-center screw anchors, such as the plastic TOGGLER screw anchor, are generally integrally molded plastic fasteners comprised of a socket base element, usually having a bore for receiving an elongated external fastening member. The base element is integrally joined at one of its ends to hingeable webs, usually pillar-like in form, which extend outwardly away therefrom and merge with an anchoring element comprised of a pair of outstretched rear toggle arms. The outer ends of the rear toggle arms are each attached to one of a pair of front arms, with a solid non-hinging connection. The front arms in turn, converge toward each other, usually to a hinge point or a close but separated convergence, at a position overlying the base element and an inner space in the fastening device. In use, the front and rear arms are folded together to form a collapsed anchoring element of the fastener which is insertable into an opening within a substrate such as a hollow wall. In hollow walls or thin substrates, the anchoring element expands, or is expanded after passing through the opening to assume the over-center anchoring position and the base element remains within the opening. In the expanded position of the anchoring element, the rear arms are adjacent the inner surface of the wall or substrate and bear the substantial portion of the load.

The over-center position enables the fastener to be self-holding in resisting pull out with light loads. With heavier loads, a fastening element, such as a screw, is threadably inserted into the bore of the base element and into engagement with the front arms at their point of convergence, above the base element. The base element is provided with two or more radially extending anti-rotation fins which cut into the periphery of the aperture of the hollow wall and prevent rotation of the anchor, in the opening, during threading of the screw within the bore of the base element. The anchor, with deployed screw, has a very high pull-out value and common hollow walls, made of gypsum, will always fail before the anchor does.

During installation, the front arms, integrally attached to the rear arms, are popped (either by themselves or by physical application of a popping element) into an over-center position, i.e. with the front hinge peaking in a direction away from the base element. The front arms, in the over-center position, serve to help spread the rear arms into load-bearing position and to stabilize them, in the manner of a keystone. Continued bearing pressure of the rear arms against the inner surface of the substrate tends to strengthen the anchoring by increasing resistance against pull-out until either failure of the substrate or the anchor by breakage. The front arms also serve as a support between the inserted screw and the rear arms to prevent collapse of the anchoring element with heavier loads. Prior to insertion of the anchor within an aperture in the wall or substrate, the front arms are folded together between the rear arms to obtain a substantially uniform diameter or cross-section of minimal dimension suitable for insertion of all the arms into the aperture. The aperture is thus sized to accommodate the thicknesses of both the front and rear arms and is commonly 5/16" (8 mm). The strength of the arms is generally sufficient such that the failure mode in most applications is that of the substrate giving way. However, in some applications, with particularly strong substrates, the anchors fail, with the application of sufficient force to cause a shear or buckling of a portion of the anchor, i.e. an ultimate proof load. Because of the keystone effect of the over-center locking of the anchor, the rear arms bend, under increasing load, at the periphery of the connection between the rear and front arms. The stress of such bending causes this portion of the rear arms to either buckle or shear.

In order to reduce the incidence of failure with strong substrates the load supporting arms would normally be thickened to enhance holding strength and reduce the effect of the bending stress. This is however accompanied by the necessity of increasing the size of the insertion hole in the substrate, an unacceptable expedient.

It is accordingly an object of the present invention to provide an over-center hollow wall anchor having increased strength without increasing overall supporting arm thickness and insertion hole dimension.

This and other objects, features and advantages of the present invention will become more evident from the following discussion and drawings in which:

FIG. 6a is a 90° turned elevation view of the shape embodiment of FIG. 4a; and

Figure 1:
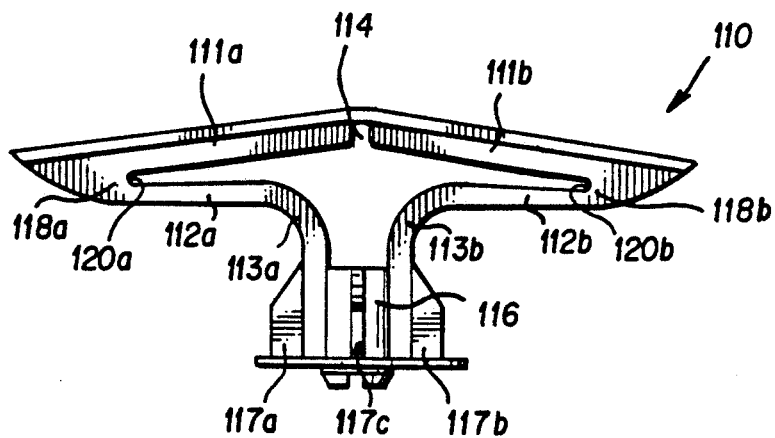
FIG. 1 is an elevation view of a prior art over-center anchor sold under the TOGGLER trademark.

Generally the present invention comprises an over-center hollow wall anchor, as described above, with rear arm reinforcement means which retard the effects of bending stress on the rear arms and which reinforcement means do not necessitate a larger insertion opening. In a preferred embodiment of the present invention the reinforcement means comprises small partial protrusions or bosses situated on each of the rear arms on the surface deployed against the wall. The bosses span the weak point of connection between front and rear arms and in this location reinforce the rear arms at the position of bending thereby retarding such bending and strengthening the arms. The bosses are preferably partial disc-like protrusions (up to the size of a semicircle) with an outwardly extending arc. These protrusions are integrally molded together with the rear arms and of the same plastic material. The arcs of the discs are aligned with the length of the rear arms and are positioned on the surfaces thereof such that they are each longitudinally in line with an anti-rotation fin of the base element. Though integral protrusions or reinforcing ribs are described in prior art anchors such as in U.S. Pat. Nos. 4,181,061; 4,828,445 and 4,878,790 the anchors described therein are either not over-center anchors, without the bending stress on the rear arms of the over-center anchors, and/or the protrusions or ribs are located in positions on the anchors which are not relevant to the effect of the present invention.

The dimensions of each disc-like protrusion are related to the dimensions of the anti-rotation fin with which it is aligned, whereby the protrusion pre-cuts a path for the anti-rotation fin, in the peripheral wall of the insertion hole, during insertion and no larger opening is required. The greater the width of the disc-like protrusion, the more reinforcement it provides. This is however offset by the drawback that a very wide protrusion does not have a cutting edge and will necessitate a larger opening to accommodate it. A preferred relative width of the protrusion is no more than about twice that of the aligned anti-rotation fin, for sufficient reinforcement without necessitating a larger opening. The longitudinal dimension of the protrusion, along the length of the rear arm, is however substantially immaterial to its function and it can accordingly be effectively reduced to a minimal size sufficient to span the bending area at the connection between front and rear arms. The height of the protrusion should be no more than that of the anti-rotation fin when they are aligned. Preferably the height should be $\frac{1}{3}$ to $\frac{1}{2}$ that of the aligned fin to reduce resistance drag on insertion. The resistance drag for the protrusion is greater than that of the fin since the protrusion must cut completely through the hollow wall material, while the fin is only imbedded part way in the wall material.

The shape of the protrusion is preferably that of a partial disc (up to a semi-circle) with a uniform thickness and a rounded "cutting edge" to facilitate insertion. Other shapes such as a wedge with a bevelled cutting edge are also operable and within the scope of the present invention. In addition (though it is preferred that the protrusion be a single one, in line with the anti-rotation fin), proper sizing and location of the protrusion along the connection point between rear and front arms, will permit the use of several protrusions and/or a protrusion not in line with the anti-rotation fin, without overly affecting insertion and insertion aperture size.

Figure 4:
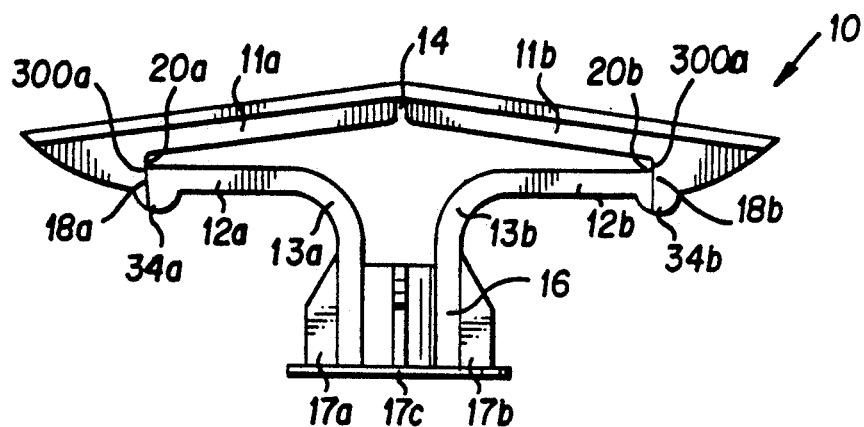
FIG. 4 is an elevation view of the over-center anchor of the present invention.

With specific reference to the drawings, FIGS. 1 and 4 depict a comparison between the prior art TOGGLER screw anchor 110 and the same screw anchor 10 having the improvements of the present invention. Both anchors have body elements 116 and 16 with anti-rotation fins 117a–d and 17a–d respectively. The body elements of the anchors have flexible webs 113a, 113b and 13a, 13b respectively, which converge into rear toggle arms 112a, 112b and 12a, 12b respectively, which in turn are attached to front toggle arms 111a, 111b and 11a, 11b at points 118a, 118b and 18a, 18b. The attachment is with an inner radius of 120a, 120b and 20a, 20b respectively. Front arms 111a, 111b and 11a, 11b are hingedly connected at 114 and 14 respectively.

Figure 2:
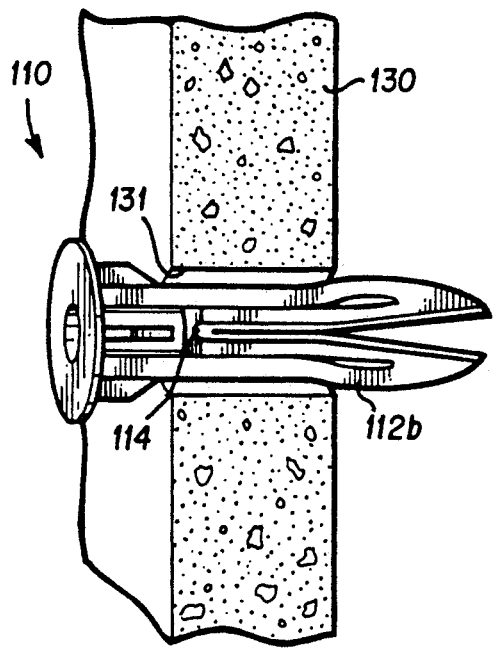
FIG. 2 is an elevation view of the over-center anchor of FIG. 1 folded for insertion into a hollow wall.
Figure 3:
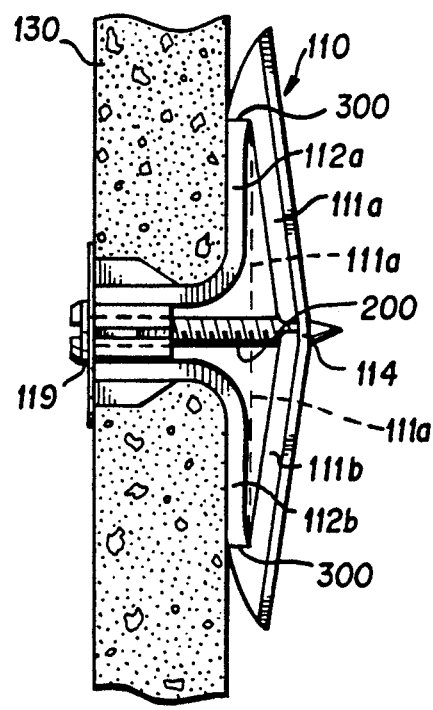
FIG. 3 is an elevation view of the over-center anchor of FIG. 1 anchored in a hollow wall showing the points of bending stress for ultimate failure in a strong substrate.

The front and rear arms of screw anchor 110, are folded together for insertion into a hole 131 in wall 130, as shown in FIG. 2. Once the folded front and rear arms 111a, 111b and 112a, 112b pass the other end of the aperture 131 they expand or are expanded to the initial configuration. Thereafter, a screw 200 is threadably inserted into bore 119 and further into engagement with the hinge connection 114 between front arms 111a, 111b to complete the full anchoring position. As pressure is exerted on the anchor by a load attached to screw 200, webs 113a and 113b and rear arms 112a and 112b are drawn toward the opening 131. The solid connections 118a and 118b move to be braced directly against the inner surface of front arms 111a and 111b with rear arms 112a and 112b bending at positions 300 until the wall gives way, under the pressure, or the rear arms buckle or shear at one of positions 300.

Figure 4A:
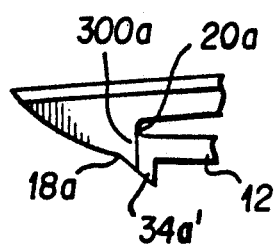
FIG. 4a is an elevation view of an alternative shape embodiment of the present invention.
Figure 5:
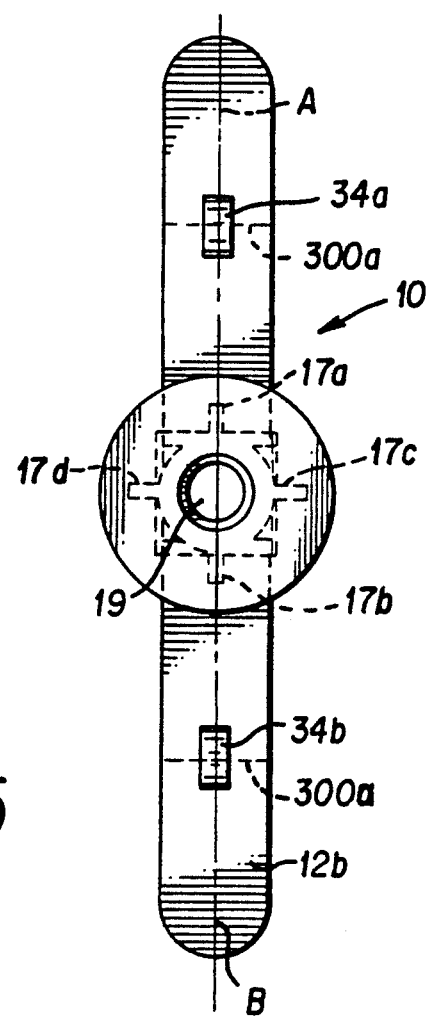
FIG. 5 is a bottom view of the anchor of FIG. 4.
Figure 6:
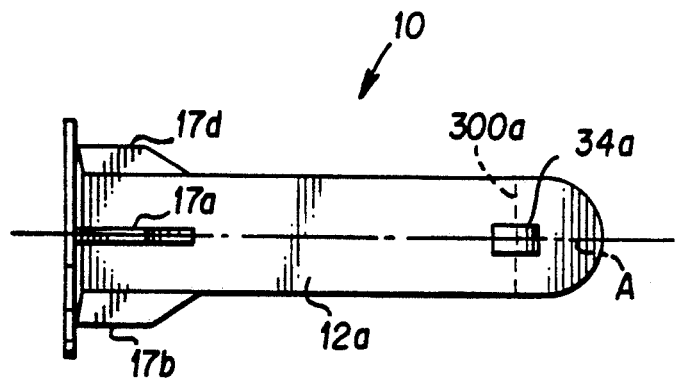
FIG. 6 is a 90° turned elevation view of the anchor of FIG. 4, folded and ready for insertion into a substrate.
Figure 6A:
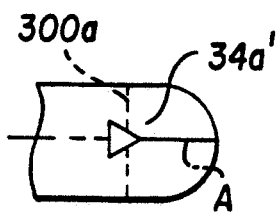

In accordance with the present invention, reinforcing partial disc-like bosses 34a–b straddle corresponding bending positions 300a in anchor 10, as shown in FIGS. 4–6, to strengthen such points against buckling or shearing. FIGS. 4a and 6a show an alternative boss configuration of a bevelled wedge 34a' similarly positioned on the rear arm. As more clearly seen in FIGS. 5 and 6, bosses 34a–b are longitudinally in line (along lines A and B) with anti-rotation fins 17a–b respectively when the arms of the anchor are folded for insertion into a wall aperture. As a result, boss 34a pre-cuts a path for fin 17a and boss 34b pre-cuts a path for fin 17b during insertion.

Figure 7:
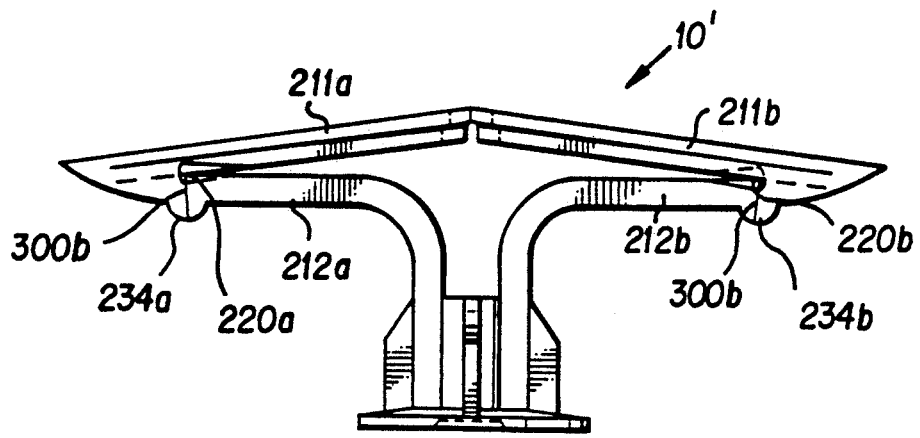
FIG. 7 is an elevation view of a second embodiment of an anchor of the present invention.

In FIG. 7, anchor 10', has connections 220a, 220b, between rear and front arms 212a, 212b and 211a, 211b, corresponding to radii 120a and 120b of FIG. 1, which has been reduced to a knife edge as described in copending application Ser. No. 07/471,864, filed Jan. 29, 1990, the disclosure of which is incorporated herein by reference thereto. As described in the co-pending application, the reduction to knife edge connection permits thickening of rear arms 212a and 212b without necessitating increase in insertion hole diameter, with the increased thickness being offset by the elimination of spacing between the front and rear arms during insertion. Reinforcing bosses 234a and 234b further strengthen the area of the knife edge connection 300b which is somewhat thinned in providing the knife edge and which area is also susceptible to the bending stress described with the anchor of FIG. 1. The additional strengthening provided by reinforcing bosses 234a and 234b either provides an over-center anchor with substantially increased holding strength in a strong substrate or permits additional significant reduction in the dimensions of the rear arms of the anchor whereby insertion hole diameter can be reduced without loss of holding strength.

It is understood that the fasteners described above and illustrated in the drawings are illustrative of the present invention and are not to be construed as limitations on the present invention. Changes and modifications may be made without departing from the scope of the present invention as defined in the following claims.

What is claimed is:

1. An over-center integrally molded plastic fastener comprised of a base element having an end integrally joined to hingeable webs, which extend outwardly away therefrom and merge with an anchoring element comprised of a pair of outstretched rear toggle arms and a pair of front toggle arms, with the rear toggle arms each being attached to a different front arm, with a solid non-hinging connection, the front arms in turn, converge toward each other, to a position overlying the base element, with the front and rear arms being adapted to be folded together to form a collapsed anchoring element of the fastener which is insertable into an opening within a substrate, wherein the front and rear arms expand, after passing through the opening, to assume an over-center anchoring position, and with the base element remaining substantially within the opening, and wherein, in the over-center anchoring position, the rear arms are adjacent a surface of the substrate and bear a substantial portion of a load placed on the anchor with the rear arms bending, under increasing load, at the periphery of the connections between the rear and front arms, characterized in that the rear arms comprise reinforcement means which retard the bending at the periphery of the connections between the rear and front arms and which reinforcement means do not necessitate a larger insertion opening.

2. The fastener of claim 1 wherein the base element comprises at least two radially extending fins which cut into the peripheral wall of the opening in the substrate.

3. The fastener of claim 2 wherein the boss is positioned on the rear arm longitudinally in line with a fin of the base element when the front and rear arms are folded together to form the collapsed anchoring element of the fastener, wherein the height of the boss is less than that of the fin with which it is aligned and wherein the width of the boss is no more than twice that of the fin with which it is aligned.

4. The fastener of claim 3 wherein the boss is comprised of a wedge having a bevel, with the bevel being in line with the fin and on a portion of the wedge distal to the fin.

5. An over-center integrally molded plastic fastener comprised of a base element having an end integrally joined to hingeable webs, which extend outwardly away therefrom and merge with an anchoring element comprised of a pair of outstretched rear toggle arms and a pair of front toggle arms, with the rear toggle arms each being attached to a different front arm, with a solid non-hinging connection, the front arms in turn, converge toward each other, to a position overlying the base element, with the front and rear arms being adapted to be folded together to form a collapsed anchoring element of the fastener which is insertable into an opening within a substrate, wherein the front and rear arms expand, after passing through the opening, to assume an over-center anchoring position, and with the base element remaining substantially within the opening, and wherein, in the over-center anchoring position, the rear arms are adjacent a surface of the substrate and bear a substantial portion of a load placed on the anchor with the rear arms bending, under increasing load, at the periphery of the connections between the rear and front arms, characterized in that the rear arms comprise reinforcement means which retard the bending at the periphery of the connections between the rear and front arms and which reinforcement means do not necessitate a larger insertion opening; wherein the reinforcement means comprises a small outwardly protruding boss integrally molded with each other of the rear arms and the periphery of the connection between the rear and front arms, whereby the boss spans the connection between front and rear arms and wherein each boss is aligned with the length of the rear arm.

6. An over-center integrally molded plastic fastener comprised of a base element having an end integrally joined to hingeable webs, which extend outwardly away therefrom and merge with an anchoring element comprised of a pair of outstretched rear toggle arms and a pair of front toggle arms, with the rear toggle arms each being attached to a different front arm, with a solid non-hinging connection, the front arms in turn, converge toward each other, to a position overlying the base element, with the front and rear arms being adapted to be folded together to form a collapsed anchoring element of the fastener which is insertable into an opening within a substrate, wherein the front and rear arms expand, after passing through the opening, to assume an over-center anchoring position, and with the base element remaining substantially within the opening, and wherein, in the over-center anchoring position, the rear arms are adjacent a surface of the substrate and bear a substantial portion of a load placed on the anchor with the rear arms bending, under increasing load, at the periphery of the connections between the rear and front arms, characterized in that the rear arms comprise reinforcement means which retard the bending at the periphery of the connections between the rear and front arms and which reinforcement means do not necessitate a larger insertion opening; wherein the base element comprises at least two radially extending fins which cut into the peripheral wall of the opening in the substrate; wherein the boss is positioned on the rear arm longitudinally in line with a fin of the base element when the front and rear arms are folded together to form the collapsed anchoring element of the fastener, wherein the height of the base is less than that of the fin with which it is aligned and wherein the width of the boss is no more than twice that of the fin with which it is aligned; and wherein the boss is comprised of a partial disc, with the arc of the disc being in line with the fin.

7. The fastener of claim 2 wherein the connection between front and rear arms is a knife edge.

* * * * *